Patented Jan. 8, 1935

1,987,583

UNITED STATES PATENT OFFICE 1,987,583

SULPHUR DYESTUFF PREPARATION

Hermann Berthold, Leverkusen-I. G. Werk-on-the-Rhine, Germany, assignor to General Aniline Works, Inc., New York, N. Y., a corporation of Delaware No Drawing. Application February 2, 1932, Serial No. 590,523. In Germany February 9, 1931

2 Claims. (Cl. 8—6)

The invention relates to the printing of textile fibers with sulphur dyestuffs.

It is known that preparations for printing purposes can be produced from sulphur dyestuffs.

According to one feature of the present invention improved preparations for printing textile fabrics are obtained by pasting the sulphur dyestuff with glycerine or another similar water-soluble polyvalent alcohol, such as ethylene glycol, diethylene glycol, thiodiglycol, thiodiglycerol or the like in the presence of water with the addition of a hydrotropically acting agent, which latter may be added to the dyestuff pasted as above or also to the dyestuff prior to the pasting or also to the glycerine or the like.

In this manner are obtained sulphur dyestuff pastes, which are extremely valuable for textile printing, both from the point of view of their physical conditions and as regards the results obtained. The pastes are very stable, do not deposit, do not dry up or form crusts, do not freeze under normal conditions and accordingly constitute preparations, which as regards their stability and constantly uniform consistency fulfil the highest requirements. From the point of view of printing practice the said pastes display in the great majority of instances the advantage of yielding stronger printings coupled with more rapid fixation than the corresponding dyestuff powders or normal aqueous pastes. A further advantage of the new pastes consists in the fact that by means thereof it is possible to print sulphur dyestuffs by processes, such as are customary for the printing of vat dyestuffs, in particular by means of hydrosulphites, sodium formaldehyde sulphoxylate and the like as reducing agents, and indeed the known processes of printing with or without preliminary reduction can be employed. This fact presents the advantage that uniform directions for printing can be given to the printer for both sulphur and vat dyestuffs, and moreover in printing with sulphur dyestuffs in accordance with the new processes of the present invention the tendency to injure the printing rollers is less than is the case in the special processes customarily employed hitherto.

In accordance with a further feature of the invention pastes possessing similar advantages both from the viewpoint of physical conditions and as regards printing properties are prepared containing the dyestuff in a vatted form. Such pastes may be produced, for example, by reducing the dyestuff in water with the addition of glycerine or of a similar water-soluble polyvalent alcohol as mentioned above, by means of hydrosulphite or of some other reducing agent suitable for the production of dyestuff vats (titanous salts, glucose and the like). The reduction is in most cases carried out in an alkaline medium. As alkalies caustic alkalies may be used, in which case a water-soluble leuco compound is formed, or better still, alkalies, which are weaker than alkali metal hydroxides, for example, ammonia, sodium carbonate, potassium carbonate, ammonium carbonate and the like. The working with such weaker alkalies presents the advantage that the resulting leuco compounds are insoluble in water and moreover, in most cases are stable towards atmospheric oxygen. Likewise, reduction may be performed in the absence of alkalies, whereby the leuco compounds are likewise formed in a water insoluble and stable form. Pastes of this kind possess particular value both as regards their physical condition and as regards their printing properties (stronger printings coupled with more rapid fixation). Pastes similar to these latter pastes and likewise containing the dyestuff in a reduced form, insoluble in water, can in many cases also be obtained by reducing the dyestuff in a neutral acid or weakly alkaline medium, isolating the leuco compound and pasting with water, glycerine or another similar water soluble alcohol.

If desired, hydroptropically acting agents are added to the pastes containing the dyestuff in a reduced form in consequence of which there is in most cases a still further increase in the strength of the printings obtainable and of the speed of fixation. The hydrotropically acting agent may be added in the operation of making up the dyestuff paste into the printing paste.

Under the expression "hydrotropically acting agents" such substances are to be understood as possess the property of rendering soluble in water products, which in themselves are insoluble in water (see Neuberg, Biochemische Zeitschrift vol. 76, (1916) page 107 ff.). As examples of such hydrotropically acting agents may be mentioned:—urea, thiourea, alkali salts or ethyl-ether sulphuric acid, glycerine hydroxy ethyl-ether, alkali salts (Na-, K-, NH$_4$) of the following acids:—isovaleric acid, isobutyric acid, phenyl-acetic acid, benzoic acid, orthotoluic acid, salicylic acid, naphthalene carboxylic acids, naphthol carboxylic acids, benzene sulphonic acids, para-toluene sulphonic acid, naphthalene-alpha- or beta-sulphonic acids, dialkyl-aniline sulphonic acids, for example, sodium dimethyl- or -diethyl metanilate or sulphanilate, sodium benzyl sulphanilate, alkali salts of the dialkylamino naphthalene sulphonic acids, furthermore, alkali salts of benzene- or naphthalene sulphinic acids, of para-toluene sulphonyldiglycine, of cyclohexenecarboxylic acid, of tetrahydronaphthalene-beta-sulphonic or carboxylic acid, of the carboxylic acids obtained by causing halogen fatty acids to react with aromatic hydroxy compounds, for example, phenoxy acetic acid, cresoxy acetic acid, and the like.

It may be mentioned that although in general the affinity of sulphur dyestuffs for the fiber is improved by the application of the present invention, the best results are obtained with such sulphur dyestuffs as have previously found application for printing purposes, it means, which already possess some affinity to textile fibers, especially cotton, when applied to the fiber according to one of the printing methods hitherto employed.

The following examples illustrate the invention without, however, limiting it thereto, the parts being by weight:—

Example 1

An aqueous press cake of the dyestuff obtainable by the sulphur fusion of carbazole-indophenol or carbazole leuco indophenyl (Colour Index No. 969) and containing 20 grams of dyestuff is stirred in 36 grams of glycerine with 5–10 grams of the sodium salt of tetrahydronaphthalene-beta-sulphonic acid and the resulting paste is made up to 20% dyestuff content.

Example 2

20 grams of the dyestuff specified in Example 1 in the form of an aqueous press cake are reduced at 70° C. by means of 8 grams of sodium hydrosulphite in the presence of 40 ccs. of aqueous 25% ammonia and 36 grams of glycerine, whereby the dyestuff is obtained in a stabilized reduced form, insoluble in water. If desired, a hydrotropically acting agent, such as for example, 5–10 grams of the sodium salt of tetrahydronaphthalene-beta-sulphonic acid can be added before, during or after the reduction. This hydrotropic agent as well as that in Example 1 may be replaced with good advantage, for example, by the sodium salt of benzoic acid, of salicylic acid, of naphthoic acid, of 2-naphthol-1-carboxylic acid or of dimethylsulphanilic acid. Likewise, both in this example and in Example 1 it is possible to replace the dyestuff specified by other sulphur dyestuffs, for example, by the dyestuff obtainable by the sulphur fusion of ethyl carbazole indophenol (Colour Index No. 971) or by Hydron Navy Blue C (Colour Index No. 355).

Example 3

20 parts of the 20% dyestuff paste in accordance with Example 1 or 2
5 parts of thiodiglycol
5 parts of water
5 parts of caustic soda solution (40° Bé.)
4 parts of calcined sodium carbonate
3 parts of the sodium salt of benzylsulphanilic acid
4 parts of sodium hydrosulphite (commercial powder)
9 parts of sodium formalydehyde sulphoxylate, and
45 parts of a thickening, containing per 100 parts:
35 parts of British gum powder
13 parts of wheat starch
2 parts of sodium salt of benzylsulphanilic acid and
50 parts of water are worked up to a dyestuff printing paste in the customary manner. Cotton is printed by means of this paste, dried and steamed with damp steam and the dyestuff developed by means of potassium chromate-acetic acid (2 grams of potassium bichromate and 5 ccs. of 30% acetic acid in one litre of water) and subsequent soaping at the boil. In this manner stronger and better fixing printings are obtained than by using the corresponding dyestuffs in the form of powder or of a normal aqueous paste.

Example 4

A printing colour is made up from:—

10–30 grams of a 20% dyestuff paste in accordance with Example 1 or 2
0–10 grams of water, and
80 grams of a thickening containing per 1000 parts:
170 parts of tragacanth 65:1000
160 parts of industrial gum 1:1
60 parts of wheat starch
150 parts of water
60 parts of British gum powder
100 parts of glycerine
150 parts of potassium carbonate, and
150 parts of sodium formaldehyde sulphoxylate.

By means of such printing colors also there can be obtained on cotton or other textile products powerful printings which fix very well. The development of the dyestuffs is carried out as described in Example 3.

Example 5

40 grams of Indocarbon CL (Colour Index, first supplement January 1928, page 43) in powder form are pasted with 72 grams of glycerine with the addition of 10–20 grams of the sodium salt of tetrahydronaphthalene-beta-sulphonic acid, as indicated in Example 1. The paste is finally made up with water to a dyestuff content of 20%. When starting from an aqueous press cake of the same dyestuff instead of from the powder, the excess of the water in the case of the cake containing more water than corresponds to the formation of a 20% dyestuff paste can be removed by evaporation. In this manner uniform pastes are obtained, which do not freeze or form crusts, which after working up to dyestuff printing pastes yield stronger and better fixing printings, than when the printing paste is produced in the customary manner using the dyestuff in the form of powder or of a normal aqueous paste.

As printing processes can be used, for example, that specified in example 4 or that described in Example 7.

Example 6

40 grams of Indocarbon CL powder are pasted with 40 grams of glycerine, 30 grams of water and 60 ccs. of 25% aqueous ammonia, (which latter may also be omitted,) the paste is heated to 70° C. and 16 grams of sodium hydrosulphite sprinkled in, whereby the dyestuff is converted into a stable reduced form, insoluble in water. If desired, a hydrotropically acting agent, for example, the sodium salt of benzene sulphonic acid or of benzylaniline sulphonic acid or the like may be added to the paste thus obtainable and the paste may be further concentrated by evaporation. When dyestuff printing pastes are produced from similar pastes, as described, for instance, in Example 4, there are obtained by means thereof, particularly powerful and quickly fixing printings.

The Indocarbon CL may be employed in conjunction with other black dyestuffs, for example, those of the indigoid series in accordance with the printing process of Example 4.

Example 7

A printing color of the following composition is made up:—

- 6 parts of Indocarbon CL in the form of a paste obtainable in accordance with Example 4 or 5
- 6 parts of thiodiglycol
- 10 parts of caustic solution (40° Bé.)
- 3 parts of calcined sodium carbonate
- 4 parts of the sodium salt of benzyl sulphanilic acid
- 15 parts of water
- 20 parts of grape sugar solution 1:1
- 6 parts of sodium formaldehyde sulphoxylate, and
- 30 parts of a thickening containing per 100 parts:—
- 50 parts of water
- 35 parts of British gum powder
- 13 parts of wheat starch, and
- 2 parts of the sodium salt of benzyl sulphanilic acid.

This printing color yields on cotton or other textile fibers powerful and quickly fixing printings.

Instead of Indocarbon CL the dyestuffs enumerated in Colour Index under No. 970 (Indocarbon S, SF) may be applied in the above examples with a similar effect.

I claim:—

1. Sulphur dyestuff preparations for printing textile fibers comprising Indocarbon CL, an alcohol of the group consisting of glycerine and other similar water-soluble polyvalent alcohols and a salt-like hydrotropically acting agent.

2. Sulphur dyestuff preparations for cotton printing comprising Indocarbon CL, glycerine and an alkali metal salt of tetrahydronaphthalene-beta-sulphonic acid.

HERMANN BERTHOLD.